Dec. 15, 1970   N. WEIGHELL   3,546,941
LIQUID LEVEL GAUGES

Filed July 17, 1968   4 Sheets-Sheet 1

INVENTOR
NORMAN WEIGHELL
BY
Holcombe, Wetherill & Brisebois
ATTORNEYS

Dec. 15, 1970   N. WEIGHELL   3,546,941
LIQUID LEVEL GAUGES
Filed July 17, 1968   4 Sheets-Sheet 2

INVENTOR
NORMAN WEIGHELL
BY
Holcombe, Wetherill & Brisebois
ATTORNEYS

Dec. 15, 1970  N. WEIGHELL  3,546,941
LIQUID LEVEL GAUGES

Filed July 17, 1968  4 Sheets-Sheet 3

INVENTOR
NORMAN WEIGHELL
BY
Holcombe, Wasserall & Brisebois
ATTORNEYS

Dec. 15, 1970  N. WEIGHELL  3,546,941
LIQUID LEVEL GAUGES
Filed July 17, 1968  4 Sheets-Sheet 4

INVENTOR
NORMAN WEIGHELL
BY
Holcombe, Wetherill & Brisebois
ATTORNEYS

United States Patent Office 3,546,941
Patented Dec. 15, 1970

3,546,941
LIQUID LEVEL GAUGES
Norman Weighell, Shildon, England, assignor to Whessoe Limited, Durham, England
Filed July 17, 1968, Ser. No. 745,563
Claims priority, application Great Britain, July 20, 1967, 33,332/67
Int. Cl. G01f 23/08
U.S. Cl. 73—321                                9 Claims

ABSTRACT OF THE DISCLOSURE

In a liquid level gauge having a float secured to one end of a tape whose other end is wound up on a spring actuated drum, the tape running over a wheel which drives an indicator showing the length of tape payed out, the tape drum is constituted by a closed rotatably mounted casing containing a stationary braking member, disposed in closely spaced relation to a surface of the casing, and the casing is filled with a viscous hydraulic fluid, thereby limiting the rate of rotation of the drum and thus the rate of descent of the float. The level indicator driven by the tape gives a digital indication over the full range of operation but includes only a single transfer mechanism. A crank handle for rotating the drum to reel up the tape incorporates a one-way drive and a friction coupling which releases to prevent overwinding.

---

Figure 1:
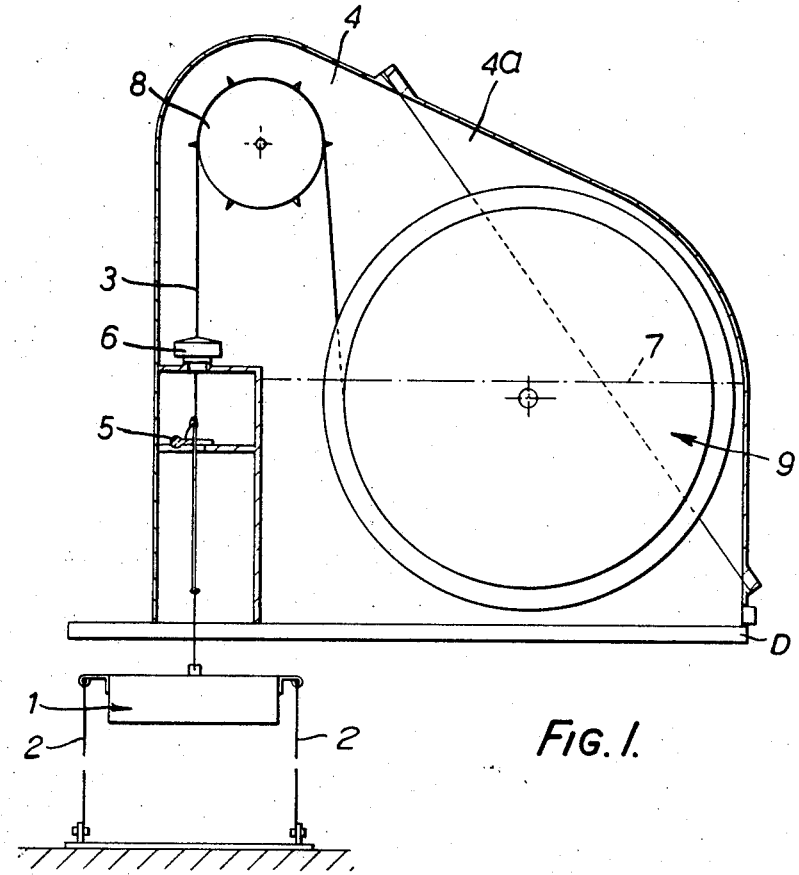

This invention relates to liquid level gauges and more especially to a gauge for measuring the cargo level in the holds of oil tankers and similar liquid cargo ships.

The liquid level gauge of the invention is of the kind comprising a float adapted to be supported by the liquid to be gauged, a tape secured at one end to the float, a tape drum to which the other end of the tape is secured, drive means for forcibly rotating the tape drum to wind up the tape thereon and raise the float clear of the liquid, spring means tending to rotate the tape drum in a direction to wind up the tape, so as to impose a constant tension on the tape when the float is supported by the liquid and the drive means are not operated, a wheel engaging the tape at a position between the float and the tape drum, the wheel having means which make driving engagement with perforations in the tape, and a level indicator driven by the wheel.

In acocrdance with one feature of the invention the tape drum of such a gauge is constituted by a closed casing having a cylindrical outer surface mounted for rotation about its axis to wind the tape around the periphery of the casing, a stationary braking member is disposed within the casing, the braking member having a surface which lies close to but is spaced from an internal surface of the rotatable casing, and the casing is filled with a hydraulic fluid, whereby rotation of the tape drum causes shearing of the film of hydraulic fluid between the said surfaces of the casing and braking member, thereby limiting the rate of rotation of the tape drum. The limitation thus imposed on the terminal velocity of the float when it is allowed to drop under its own weight prevents any excessive pay-out of tape due to inertia of the drum assembly when the float is arrested at the bottom of its fall; it also avoids any risk of the float being damaged by striking the bottom of an empty tank. Preferably, the spring motor which tends to rotate the tape drum in a direction to wind up the tape thereon is accommodated within the drum itself, thereby providing a self-contained sealed assembly.

In accordance with another feature of the invention the level indicator driven by the wheel engaged by the perforations in the tape comprises a spindle driven by said wheel so as to make one complete revolution for each unit of length movement of said tape, an indicator drum fast to said spindle and marked to indicate fractions of a unit of length, a second wheel, a Geneva type transfer mechanism connecting said spindle to said second wheel to effect partial rotation of said second wheel upon the completion of each full revolution of said spindle, a pair of drums disposed in parallel relation on opposite sides of said second wheel, and a spring strip engaging said second wheel and having its ends respectively wound upon said drums, said spring strip being formed with perforations engaging means on said second wheel and being marked to indicate units of length. With this arrangement a digital indication of level in feet or decimeters over the full range required in practice (say 0 to 120 feet or 0 to 40 metres) is obtained by the use of only a single transfer mechanism, thus simplifying the design and improving the operation, as compared with conventional digital indicators in which a transfer mechanism is used for each digit.

Other features and advantages of the invention will appear from the following description, given with reference to the accompanying drawings, of one particular form of gauge constructed in accordance with the invention and from the appended claims.

Figure 2:
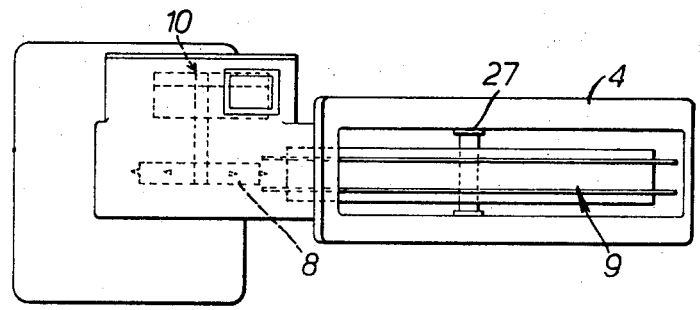
Figure 3:
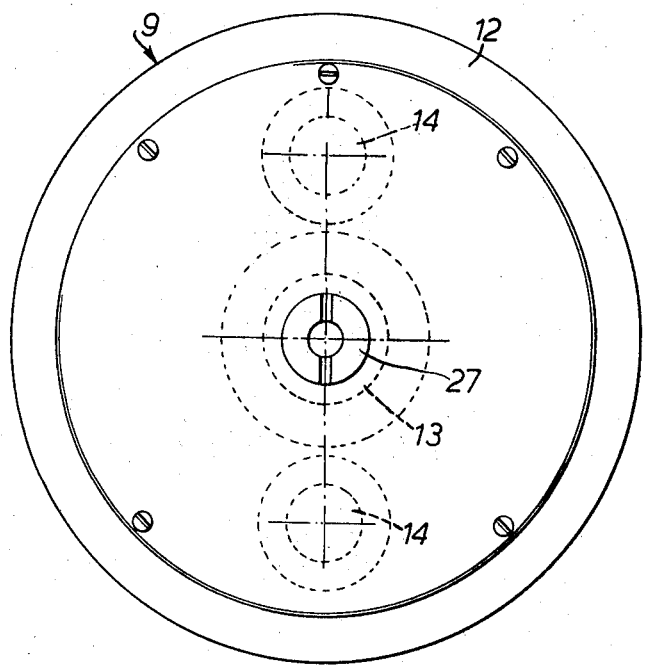
Figure 4:
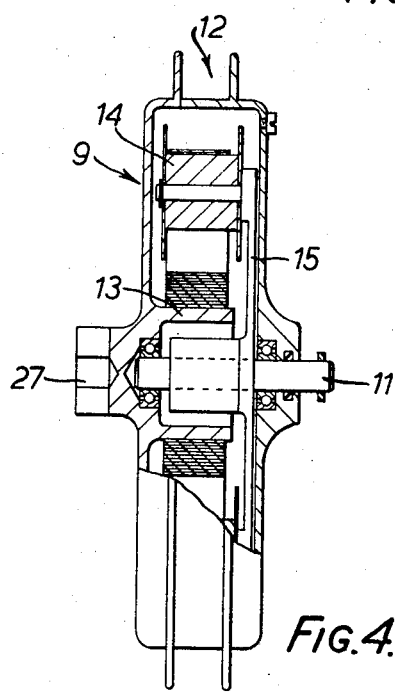
Figure 5:
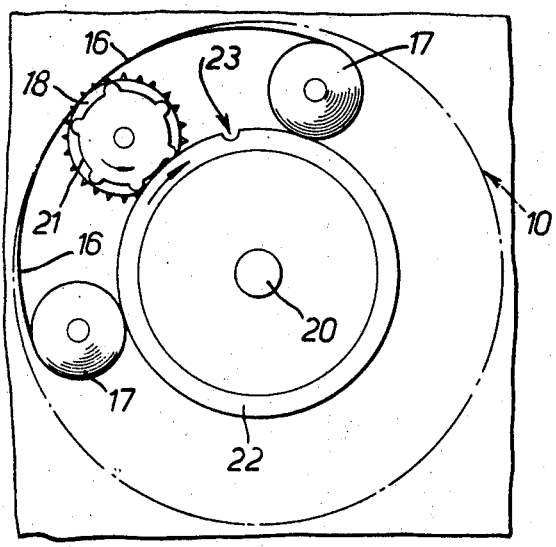
Figure 6:
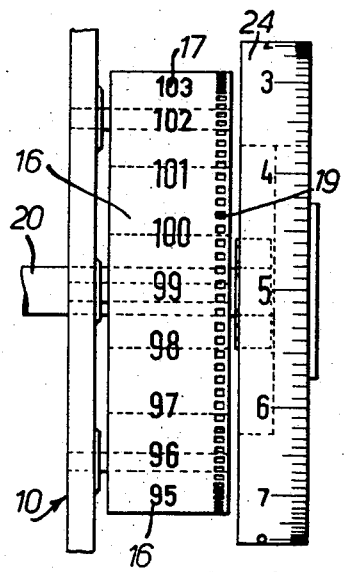
Figure 9:
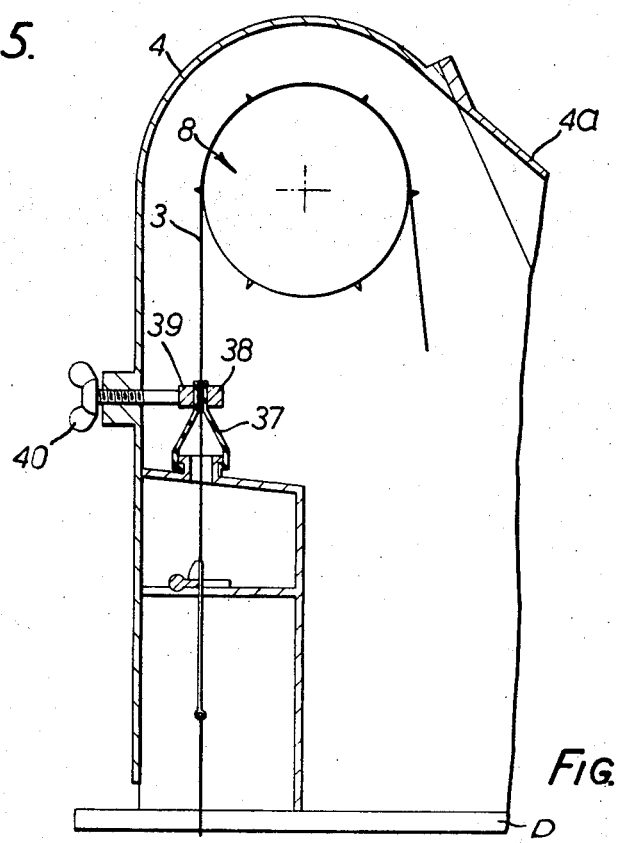
Figure 7:
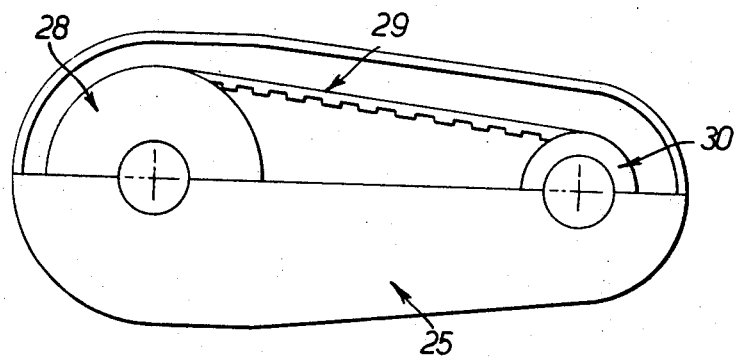
Figure 8:
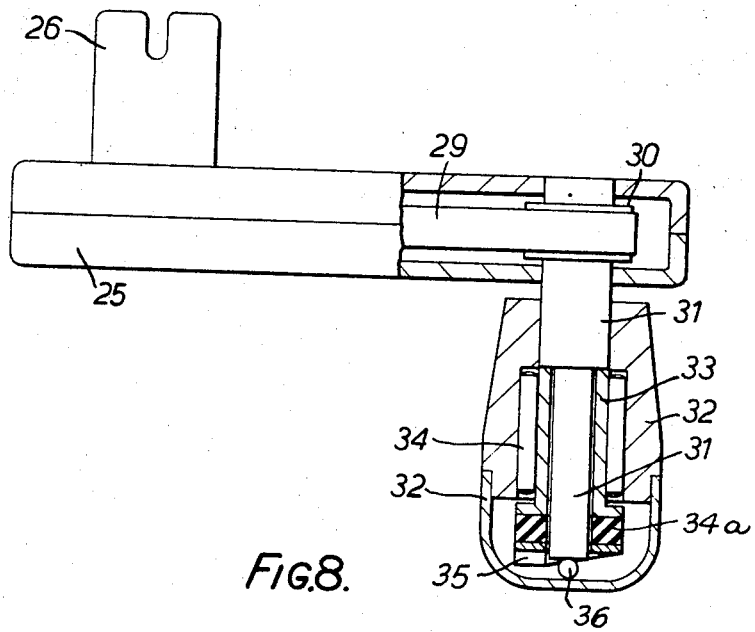

In the drawings:

FIG. 1 is a diagrammatic side view of the complete gauge installation;
FIG. 2 is a plan view thereof;
FIG. 3 is an end view of the tape recovery drum;
FIG. 4 is a sectional side view of the drum;
FIG. 5 is an end view of parts of the digital indicator;
FIG. 6 is a plan view of these parts;
FIG. 7 is a part sectional side view of a detachable handle for rotating the tape recovery drum;
FIG. 8 is a part sectional plan of the handle, and
FIG. 9 is a view corresponding to a part of FIG. 1, showing a modification.

Referring first to FIGS. 1 and 2 of the drawings, the gauge comprises a float 1, guided by wires 2 which extend the full height of the hold to be gauged, and supported on a stainless steel tape 3, perforated with sprocket holes. The tape passes into a gauge head 4 mounted on deck D, the tape passing through a locking and suspension device 5 and a wiper 6 into a compartment which is filled with oil to the level of the line 7. The tape passes over a pin wheel 8 and is wound up on a recovery drum 9. To gauge the level or ullage in the hold, the lock securing the float is released and the float drops under its own weight until it reaches the liquid surface (or the tank bottom, if the tank is empty) the readout being displayed on a digital indicator 10 driven by the wheel 8. After gauging, the drum 9 is rotated to reel in the tape and the float is secured in its raised position.

The tape drum 9, shown separately in FIGS. 3 and 4, takes the form of a casing rotatably supported on a fixed spindle 11 and formed at its periphery with a groove 12 for receiving the tape. The casing accommodates a constant torque spring motor composed to two spring strips of the kind sold under the trademark "Neg'ator," which are wound on a central hub 13 and on two storage drums 14, carried by a disc 15 which is secured to the fixed spindle 11, the arrangement ensuring a constant tape tension. The rate of rotation of the drum (and thus the rate at which the float falls when released) is limited by viscous damping means accommodated within the tape drum casing. The casing is filled with a silicone hydraulic fluid having a high viscosity which does not greatly alter with changes of temperature and damping is effected by the shearing as the drum rotates of the thin film of this fluid between the stationary disc 15 and the adjacent wall of the rotating casing 9. As a result of this damping, the float when falling reaches a terminal velocity which is low enough to prevent the float from being damaged when it strikes the bottom of an empty tank and to prevent any excessive pay out of tape due to the inertia of the drum assembly when the float is arrested at the bottom of its fall.

The digital indicator 10 is shown separately in FIGS. 5 and 6. This indicator incorporates another constant force spring strip of the kind sold under the trademark "Neg'ator." This spring strip 16 extends between a pair of drums 17 over a sprocket wheel 18, the spring strip being formed along one edge with perforations 19 to engage the sprocket teeth. The spring strip is marked with the digits required to show the level readout in (say) feet and the sprocket 18 is partially rotated (to advance the spring strip and change the digits exposed at an observation window) once in each revolution of an input spindle 20, which is driven by the wheel 8 (FIG. 1). This intermittent partial rotation of sprocket 18 is effected by a Geneva type transfer mechanism comprising a six-toothed pinion 21, fast on the shaft of sprocket 18, and a disc 22, fast on input shaft 20 and having a notch 23 for engaging the teeth of pinion 21. The readout in inches and fractions of an inch is provided by graduations on a drum 24 also fast on the spindle 20, the graduations on the drum being visible through the same observation window as the markings on spring strip 16. Alternatively, of course, the strip 16 and drum 24 may be graduated to give a readout in decimeters and millimeters.

A detachable crank handle for rotating the tape recovery drum 9 to wind up the tape thereon is shown separately in FIGS. 7 and 8. Projecting from one end of a casing 25 is a shaft 26 which can be coupled to a projection 27 (FIGS. 2, 3 and 4) on the tape drum 9. Within the casing, shaft 26 carries a pulley 28, which is coupled through a positive drive belt 29 to a pulley 30 of one half the diameter. Pulley 30 has a shaft 31 which projects from the opposite end of casing 25 and carries a hand grip 32. By means of this crank handle, the tape pulley 9 can be rotated in a direction to wind up the tape and raise the float with a 2:1 speed reduction. The hand grip 32 is not fast on shaft 31, but is coupled to it through a sleeve 33, coaxial with the shaft and the hand grip, a unidirectional roller clutch 34 being interposed between the hand grip and the sleeve so that the crank handle cannot be used to accelerate the unwinding of the tape from the drum 9. The sleeve 33 has bonded to its end face an annular rubber member 34a, whose opposite face is bonded to a face cam 35, the cam being pressed into frictional engagement with a cross pin 36 on shaft 31 by the resilience of the rubber member 34. The frictional coupling thus provided between hand grip 32 and shaft 31 is sufficient to allow the float to be raised, but if rotation is continued after the float has reached its top position, the frictional coupling slips and the crank handle revolves around pulley 30, leaving the latter stationary.

Under certain circumstances it may be necessary to prevent the escape of any gas or vapour from the tank in which the liquid is stored, for example because of the risk of explosion, or toxic hazard. FIG. 9 shows an arrangement useful in such circumstances for sealing the aperture through which the tape enters the tank. Most liquids which make such precautions necessary are refined, and therefore clean, so the tape wiper 6 shown in FIG. 1 is omitted and replaced by the tape block valve shown in FIG. 9. At its point of entry into the tank, the tape 3 is surrounded by a tube 37 of flexible material, the lower end of which is sealingly secured around the mouth of the restricted aperture through which the tape enters the tank. The upper part of the tube lies between a stationary anvil 38 and a compressor block 39 movable towards and away from the anvil by a hand screw 40. Should it be necessary to open the gauge head 4 (by removing the flanged cover 4a) in order to obtain access to the gauge mechanism, the screw 40 is first operated to move block 39 towards anvil 38, thereby collapsing the tube 37 and forcing its walls into sealing engagement with the tape 3 (as shown in the figure) to seal the tank.

What is claimed is:

1. A liquid level gauge comprising a float adapted to be supported by the liquid to be gauged, a tape secured at one end to the float, a tape drum to which the other end of the tape is secured, drive means for forcibly rotating the tape drum to wind up the tape thereon and raise the float clear of the liquid, spring means tending to rotate the tape drum in a direction to wind up the tape, so as to impose a constant tension on the tape when the float is supported by the liquid and the drive means are not operated, a wheel engaging the tape at a position between the float and the tape drum, the wheel having teeth which make driving engagement with perforations in the tape, and a level indicator driven by the wheel, wherein said tape drum is constituted by a closed casing having a cylindrical outer surface mounted for rotation about its axis to wind the tape around the periphery of the casing, said spring means is positioned within said casing, a stationary braking member is also disposed within the casing, the braking member having a surface which lies close to but is spaced from an internal surface of the rotatable casing, and the casing is filled with a hydraulic fluid, whereby rotation of the tape drum causes shearing of the film of hydraulic fluid between the said surfaces of the casing and braking member, thereby limiting the rate of rotation of the tape drum.

2. A liquid level gauge comprising a float adapted to be supported by the liquid to be gauged, a tape secured at one end to the float, a tape drum to which the other end of the tape is secured, drive means for forcibly rotating the tape drum to wind up the tape thereon and raise the float clear of the liquid, spring means tending to rotate the tape drum in a direction to wind up the tape, so as to impose a constant tension on the tape when the float is supported by the liquid and the drive means are not operated, a wheel engaging the tape at a position between the float and the tape drum, the wheel having teeth which make driving engagement with perforations in the tape, and a level indicator driven by the wheel, wherein said tape drum is constituted by a closed casing having a cylindrical outer surface mounted for rotation about its axis to wind the tape around the periphery of the casing, a stationary braking member is disposed within the casing, the braking member having a surface which lies close to but is spaced from an internal surface of the rotatable casing, the casing is filled with a hydraulic fluid, whereby rotation of the tape drum causes shearing of the film of hydraulic fluid between the said surfaces of the casing and braking member, thereby limiting the rate of rotation of the tape drum, and said casing includes a pair of circular end walls, bearings at the centers of said end walls rotatably supporting the casing upon a stationary spindle, one of said end walls having a plane internal surface, and said braking member is constituted by a stationary disc fast to said spindle and having a plane surface extending parallel to and closely spaced from said plane internal surface of said end wall.

3. A liquid level gauge in accordance with claim 2, wherein said spring means are enclosed within said casing.

4. A liquid level gauge in accordance with claim 2, wherein the other circular end wall of the casing carries within the casing a cylindrical hub, coaxially surrounding the stationary spindle and the stationary disc rotatably supports a pair of storage drums disposed on opposite sides of said hub and with their axes parallel to that of said hub, said spring means being constituted by a pair of spring strips each having one of its ends wound around said hub, the other ends of said spring strips being respectively wound around said storage drums.

5. A liquid level gauge comprising a float adapted to be supported by the liquid to be gauged, a tape secured at one end to the float, a tape drum to which the other end of the tape is secured, drive means for forcibly rotating the tape drum to wind up the tape thereon and raise the float clear of the liquid, spring means tending to rotate the tape drum in a direction to wind up the tape, so as to impose a constant tension on the tape when the float is supported by the liquid and the drive means are not operated, a wheel engaging the tape at a position between the float and the tape drum, the wheel having teeth which make driving engagement with perforations in the tape, and a level indicator driven by the wheel, wherein said level indicator comprises a spindle driven by said wheel so as to make one complete revolution for each unit of length movement of said tape, an indicator drum fast to said spindle and marked to indicate fractions of a unit of length, a second wheel, a Geneva type transfer mechanism connecting said spindle to said second wheel to effect partial rotation of said second wheel upon the completion of each full revolution of said spindle, a pair of drums disposed in parallel relation on opposite sides of said second wheel, and a spring strip engaging said second wheel and having its ends respectively wound upon said drums, said spring strip being formed with perforations engaging means on said second wheel and being marked to indicate units of length.

6. A liquid level gauge comprising a float adapted to be supported by the liquid to be gauged, a tape secured at one end to the float, a tape drum to which the other end of the tape is secured, drive means for forcibly rotating the tape drum to wind up the tape thereon and raise the float clear of the liquid, spring means tending to rotate the tape drum in a direction to wind up the tape, so as to impose a constant tension on the tape when the float is supported by the liquid and the drive means are not operated, a wheel engaging the tape at a position between the float and the tape drum, the wheel having teeth which make driving engagement with perforations in the tape, and a level indicator driven by the wheel, wherein said drive means for forcibly rotating the tape drum is constituted by a crank handle comprising a casing, a pair of parallel shafts rotatably supported in said casing and projecting to opposite sides thereof, a pair of pulleys disposed within the casing and respectively fast to said shafts, said pulleys being of different diameters, an endless belt passing round and drivingly connecting said pulleys, means for drivingly connecting to the tape drum the projecting end of the shaft which carries the larger pulley, so that rotation of said smaller pulley in said casing causes rotation of said drum, and a hand grip on the projecting end of the shaft which carries the smaller pulley.

7. A liquid level gauge in accordance with claim 6, wherein the driving connection between said hand grip and the shaft which carries the larger pulley includes a roller clutch giving unidirectional drive only.

8. A liquid level gauge in accordance with claim 6 wherein the driving connection between said hand grip and the shaft which carries the larger pulley includes a frictional coupling adapted to slip when the resistance to rotation of the tape drum exceeds a predetermined limit.

9. A liquid level gauge on a tank having a cover comprising a float adapted to be supported by the liquid to be gauged, a tape secured at one end to the float, a tape drum to which the other end of the tape is secured, drive means for forcibly rotating the tape drum to wind up the tape thereon and raise the float clear of the liquid, spring means tending to rotate the tape drum in a direction to wind up the tape, so as to impose a constant tension on the tape when the float is supported by the liquid and the drive means are not operated, a wheel engaging the tape at a position between the float and the tape drum, the wheel having teeth which make driving engagement with perforations in the tape, and a level indicator driven by the wheel, wherein the tape extends into the tank containing the liquid to be gauged through an aperture of restricted dimensions, a tube of flexible material surrounding the tape has one of its ends sealingly secured around the mouth of the aperture, and means are provided mounted on one wall of the tank for compressing the other end of the tube to collapse its walls together into sealing engagement with the tape for keeping the tank sealed when the cover is removed.

References Cited

UNITED STATES PATENTS

| | | | |
|---|---|---|---|
| 1,237,735 | 8/1917 | Wright | 33—126.6 |
| 1,671,553 | 5/1928 | Sheldrick | 235—140X |
| 2,342,271 | 2/1944 | Hatcher | 242—107 |
| 2,345,054 | 3/1944 | Korevec | 73—321 |
| 2,363,533 | 11/1944 | King | 242—84.44X |
| 2,904,282 | 9/1959 | Zelnick | 242—107 |
| 3,098,254 | 7/1963 | Rose | 33—126.7X |
| 3,104,861 | 9/1963 | Heyer et al. | 188—90(A5)X |

FOREIGN PATENTS

| | | | |
|---|---|---|---|
| 781,022 | 8/1957 | Great Britain | 73—321 |
| 927,430 | 5/1963 | Great Britain | 73—321 |

LOUIS R. PRINCE, Primary Examiner

D. M. YASICH, Assistant Examiner

U.S. Cl. XR.

74—545; 242—84.44